(12) United States Patent
Bouthemy et al.

(10) Patent No.: US 9,003,044 B2
(45) Date of Patent: Apr. 7, 2015

(54) HOME HUB FOR IP MULTIMEDIA SUBSYSTEM (IMS)/WEB SERVICES INTERACTION

(75) Inventors: Jean-Luc R. Bouthemy, Bellevue, WA (US); Christopher S. Park, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 389 days.

(21) Appl. No.: 12/843,575

(22) Filed: Jul. 26, 2010

(65) Prior Publication Data

US 2012/0023238 A1 Jan. 26, 2012

(51) Int. Cl.
*G06F 15/16* (2006.01)
*H04L 29/06* (2006.01)
*H04L 12/66* (2006.01)

(52) U.S. Cl.
CPC ........ *H04L 65/1016* (2013.01); *H04L 65/1073* (2013.01); *H04L 12/66* (2013.01); *H04L 65/1006* (2013.01); *H04L 65/103* (2013.01); *H04L 65/105* (2013.01); *H04L 65/1036* (2013.01)

(58) Field of Classification Search
CPC ............ H04L 65/1006; H04L 65/1073; H04L 65/103; H04L 65/105; H04L 12/66
USPC ........................................................ 709/227
See application file for complete search history.

(56) References Cited

U.S. PATENT DOCUMENTS

| | | | | |
|---|---|---|---|---|
| 8,281,010 | B2 * | 10/2012 | Ansari et al. | 709/225 |
| 2007/0195805 | A1 * | 8/2007 | Lindgren | 370/401 |
| 2009/0006630 | A1 * | 1/2009 | Tsumori et al. | 709/227 |
| 2009/0164645 | A1 * | 6/2009 | Sylvain | 709/228 |
| 2010/0205662 | A1 * | 8/2010 | Ibrahim et al. | 726/7 |

OTHER PUBLICATIONS

Zheng et al.; "A System Architecture for SIP/IMS-based Fixed/Mobile Multimedia Services on Thin Clients," Hoegskollen I Agder, 2007; Agder University College, Grimstad, Norway.

* cited by examiner

*Primary Examiner* — Richard G Keehn

(57) ABSTRACT

Systems and methods for home hub for IMS/Web services interaction are described. In one aspect, a data communication gateway operating as a home hub includes a processor that executes computer program instructions to provide IMS/Web services interaction to one or more client computing devices. The client computing device(s) are operatively coupled to the home hub. The client computing device(s) are not Session Initiation Protocol (SIP)-enabled devices. To provide SIP- or IMS-based services to such client computing devices, the home hub registers on behalf of the client computing device(s) to a SIP network. The home hub replies to SIP messages on behalf of the SIP network registered device(s) to process all SIP request(s) and provide the registered device(s) with corresponding SIP-based service(s).

18 Claims, 7 Drawing Sheets

HOME HUB FOR IP MULTIMEDIA SUBSYSTEM (IMS)/WEB SERVICES INTERACTION

BACKGROUND

Internet Protocol Multimedia Subsystem (IMS) is a standardized set of specifications that describes a Next Generation Network (NGN) with a generic architecture for Internet Protocol (IP)-based telephony and multimedia services. Third Generation Partnership Projects (3GPP/3GPP2) enable and support the evolution of mobile networks beyond second-generation (2G) mobile systems such as Global System for Mobile Communications (GSM) and radio technology initially defined IMS. IMS was also adopted by other standardization bodies (e.g., Wi-MAX and TISPAN) for their future networks. IMS uses Session Initiation Protocol (SIP) to control multimedia communication sessions such as video and voice calls over IP (VoIP). Benefits of IMS core networks include, for example, VoIP and multimedia services, as well as Instant Messaging and presence, standardized interfaces, reusable components, and improved Quality of Service (QoS) mechanisms, etc.). Telecommunication Service Providers (TSPs) are investing in and deploying IMS/IP core networks to provide these benefits to subscribers.

TSPs with a legacy mobile network typically want to take advantage of IMS Application Server provided services. However, due to limited protocol support and other limitations of device capabilities, many legacy devices today lack implementation support for IMS services. Home telephones, for example, are often stand-alone systems that communicate primarily using legacy, wired telephone infrastructures. Although wireless home telephones are widely used, they normally are not part of the more integrated infrastructure and information corpus with which our cellular phones and personal computers communicate. Such legacy devices cannot generally take advantage of IMS Operator provided services.

BRIEF DESCRIPTION OF THE DRAWINGS

The detailed description is set forth with reference to the accompanying figures, in which the left-most digit of a reference number identifies the figure in which the reference number first appears. The use of the same reference numbers in different figures indicates similar or identical items or features.

DETAILED DESCRIPTION

Overview

Figure 1:
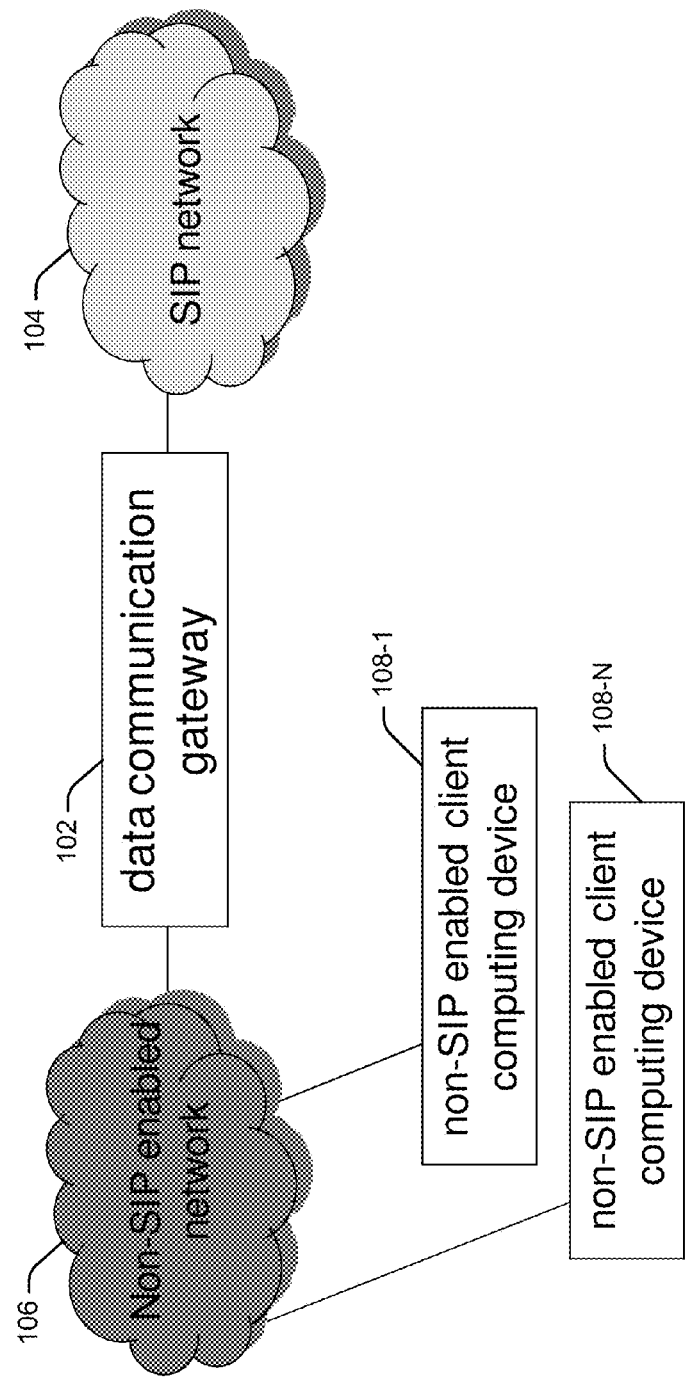
FIG. 1 shows an exemplary environment capable of implementing the systems and methods described herein, according to one embodiment.

Systems and methods for Home Hub for IP Multimedia Subsystem (IMS)/Web Services Interaction allow consumer computing devices to access IMS services independent of whether the devices respectively support a Session Initiation Protocol (SIP)/IMS client. To this end, the consumer computing devices (clients) are operatively coupled (e.g., via Personal Area Network or Local Area Network such as Wi-Fi or Digital Enhanced Cordless Telecommunications (DECT)) to a data communications gateway (a "home hub") in the system. The data communications gateway connects to a communications infrastructure such as a home network, the Internet, telephony networks, and other networks. The data communications gateway communicates with local communications devices such as handheld voice communication devices or handsets, tablet media enabled devices, etc. The gateway has one or more local ports that communicate with the local communication devices. The local ports can include a wireless network access point, wired analog telephone ports, a wireless telephone transceiver such as a Digital Enhanced Cordless Telecommunications (DECT) digital telephone transceiver, and/or other types of dedicated or networked ports such as Ethernet ports. In addition to network routing for use in conjunction with various types of connected devices, the gateway provides for SIP/IMS/Web services interaction.

In one implementation, for example, the data communications gateway acts as a Digital Living Network Alliance (DLNA) Mobile Network Connectivity Function (M-NCF) to provide a bridge between DLNA-capable devices within the home network connectivity. The gateway also acts as a Media Interoperability Unit (MIU) to provide content transformation between devices in the home network and remote network.

As a hub, the data communication gateway registers on behalf of all consumer devices to an SIP and/or IMS network. Such registration may be based on IMS information including one or more of public and private user identities, credentials, and address of an IMS entry point. In one implementation, such IMS information is stored in the data communication gateway or an add-on device (e.g., UICC). The gateway translates protocols used in IMS such as SIP, Extensible Markup Language (XML), Configuration Access Protocol (XCAP), Real-Time Protocol (RTP), and Message Sessions Relay Protocol (MSRP) into protocols supported by DLNA-capable devices. As the gateway is aware of the connected DLNA devices (the devices in the home network), it forwards the content only to devices able to receive it. For example, if several phones are connected, an incoming call (from outside) can be forwarded to one, several, or all cell phones which are connected in the home network.

In one implementation, the data communications gateway can bridge other networks, e.g., networks using Extensible Messaging and Presence Protocol (XMPP) or Google Wave (technology based on XMPP). In one implementation, and responsive to receiving requests in a particular native protocol (e.g., HTTP or other protocol) from a client device, the systems and methods:

(a) Translate the requests into corresponding SIP methods directed to the IMS network; and (b) Translate corresponding SIP responses from the IMS network into the corresponding native protocol (e.g., HTTP, XMPP, etc.) for communication to the client to provide the client with the requested IMS service(s).

Such message translations are implemented, for example:

(c) Using XMPP/Jingle, wherein XMPP is translated into SIP and SIP is translated into XMPP, with different identity mappings for XMPP and SIP being performed by gateway 102;

(d) Using HTTP over Simple Object Access Protocol (SOAP), such as implementing some of the Parlay-X specifications such as presence, call control, and conferencing in the system hub; and (e) Implementing a RESTful interface such as a URL, including the arguments used to generate the corresponding SIP methods, e.g., an XML document may be used, and arguments could be based on the SIP Factory method defined as JSR 289 specification as an ASCII string, identifiers of the sender (from) and recipient (to); and/or so on.

Jingle, an extension of XMPP, is utilized to set up, manage, and tear down multimedia sessions between gateway device 102 and consumer devices operatively coupled thereto. Sessions can support a wide range of application types such as voice chat, video chat, and file transfer, and use a wide range of media transport methods such as Transmission Control Protocol (TCP), User Datagram Protocol (UDP), Real-Time Transport Protocol (RTP), or even in-and XMPP. In the case of voice and video chat, a jingle negotiation generally results in use of RTP as the media transport.

In another implementation, media associated with a session are carried over HTTP and transformed as UDP/TCP packets by the system data communications gateway according to RFC 3261 defined by IETF. Message Session Relay Protocol (MSRP) payloads are carried over TCP. In another implementation, the gateway is an unlicensed spectrum home/enterprise wireless access point (a UMA/GAN access point) or a femtocell (also called Home Node B by $3^{rd}$ Generation Partnership Project, 3GPP).

These and other aspects of the systems and methods are now described in greater detail.

An Exemplary System

FIG. 1 shows an exemplary environment 100 capable of implementing the systems and methods described herein, according to one embodiment. More particularly, FIG. 1 illustrates data communication gateway 102 operatively coupled to SIP network 104, non-SIP network 106 and one or more non-SIP enabled client computing devices 108 (e.g., 108-1 through 108-N). Data communication gateway 102 operates as a central hub for voice, data services, and messaging communication between multiple device(s) 108 and devices operatively coupled to SIP network 104. Data communication gateway 102 includes router functionality for communicating data between various networks 104 and 106 and various devices. Data communication gateway 102 further includes Wi-Fi functionality for sending and receiving data using a Wi-Fi network.

Figure 2:
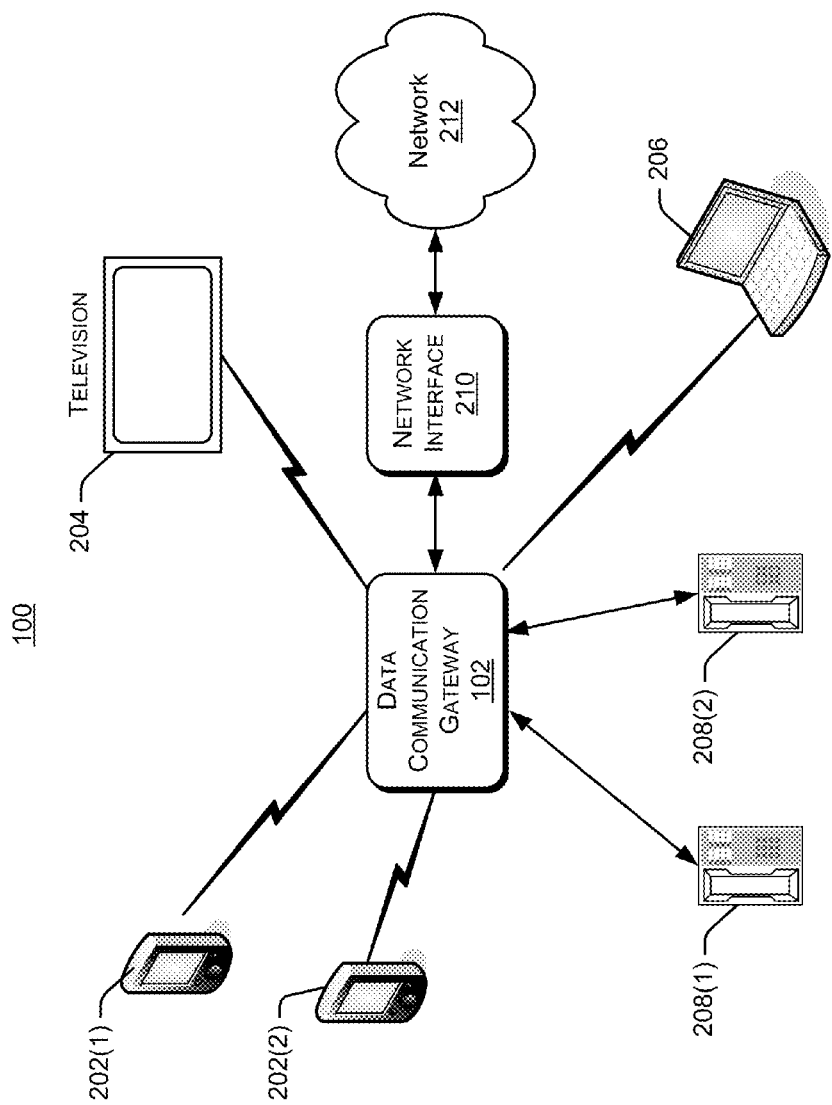
FIG. 2 shows further aspects of the exemplary environment of FIG. 1, which is capable of implementing the systems and methods described herein, according to one embodiment.

FIG. 2 shows further exemplary aspects of environment 100 of FIG. 1 capable of implementing the systems and methods described herein, according to one embodiment. As shown in FIG. 1, data communication gateway 102 is coupled to any number of non-SIP enabled devices 108 such as consumer computing devices ("clients"): two portable phones 202(1) and 202(2), a television 204, a computer 206, and two wired telephones 208(1) and 208(2). In one embodiment, portable phones 202(1) and 202(2) are DECT (Digital Enhanced Cordless Telecommunications) phones, which are cordless phones that can be used in a local environment. DECT phones typically communicate with a base station, which is connected to a phone line or data communication network. In the embodiment of FIG. 1, the base station functionality is contained within data communication gateway 102, thereby eliminating the need for a separate base station. Although two portable phones 202(1) and 202(2) are shown in FIG. 2, particular implementations of data communication gateway 102 can support any number of portable phones.

In an alternate embodiment, portable phones 202(1) and 202(2) communicate with data communication gateway 102 via a Wi-Fi communication link. In this embodiment, the data communicated between portable phones 202(1), 202(2), and data communication gateway 102 may be native UMA (Unlicensed Mobile Access) voice data.

Television 204 displays various data received from data communication gateway 102, such as program information, video content, audio content, web site content, and so forth. In the embodiment of FIG. 2, television 204 communicates with data communication gateway 102 via a Wi-Fi communication link using the DLNA (Digital Living Network Alliance) specification. Through the communication link with data communication gateway 102, television 204 is capable of communicating with Internet-based web servers to retrieve content and interact with those servers.

Computer 206 is shown in FIG. 2 as a laptop or netbook style of computing device. Alternate embodiments may include any type of computing device, such as a desktop computer, a tablet, a handheld computer, a set top box, a game console, and the like. Computer 206 communicates with data communication gateway 102 via a Wi-Fi communication link or other wireless communication system. In alternate embodiments, computer 206 may communicate with data communication gateway 102 via a wired communication link using any data communication protocol.

Wired telephones 208(1) and 208(2) are traditional telephones that are coupled to data communication gateway 102 via a traditional telephone cable. In a particular implementation, data communication gateway 102 includes support for two wired telephones. Alternate embodiments of data communication gateway 102 include support for any number of wired telephones. In one implementation, voice data associated with wired telephones 208(1) and 208(2) are communicated to other wired telephones via the Internet or other data communication network.

Data communication gateway 102 also is coupled to network interface(s) 210, which is coupled to a data communication network 212, such as the Internet. Interface 210 can comprise an Ethernet communications port for connection to an Internet data source or other wide-area network source. Gateway 102 may utilize other types of network interfaces. In some embodiments, for example, interface 210 can be a radio or other wireless transceiver that transmits and receives radio frequency communications via an antenna. The radio interface may facilitate wireless connectivity between the data communications gateway 102 and various cell towers, base stations, and/or wide-area access points.

Network interface(s) 210 can communicate with a variety of web servers and other resources accessible via data communication network 212. Data communication network 212 may include any number of data communication networks, such as local area networks (LANs), home networks, wide area networks (WANs), SIP-enabled networks 104 (FIG. 1), wireless networks (e.g., Wi-Fi, Digital Enhanced Cordless Telecommunications (DECT), Wi-MAX, 3G, LTE, etc.), wireline networks (e.g., cable or DSL), telephony service provider networks, IMS networks, and the like. Utilizing network 212 includes, for example: network client end-users (e.g., connected to a home network), mobile telephony operators offering traditional cellular Internet connection to mobile phones, Internet Service Providers (ISP), IMS Operators providing IMS services to IMS devices, third-party application providers offering application services over the IMS network, etc. In this particular implementation, gateway 102 is in a home network.

As used herein, the term "local device" collectively refers to portable phones 202(1) and 202(2), television 204, computer 206 and wired telephones 208(1) and 208(2). These devices generally are referred to as "local devices" due to their proximate location to data communication gateway 102 and their ability to communicate with the gateway.

Figure 3:
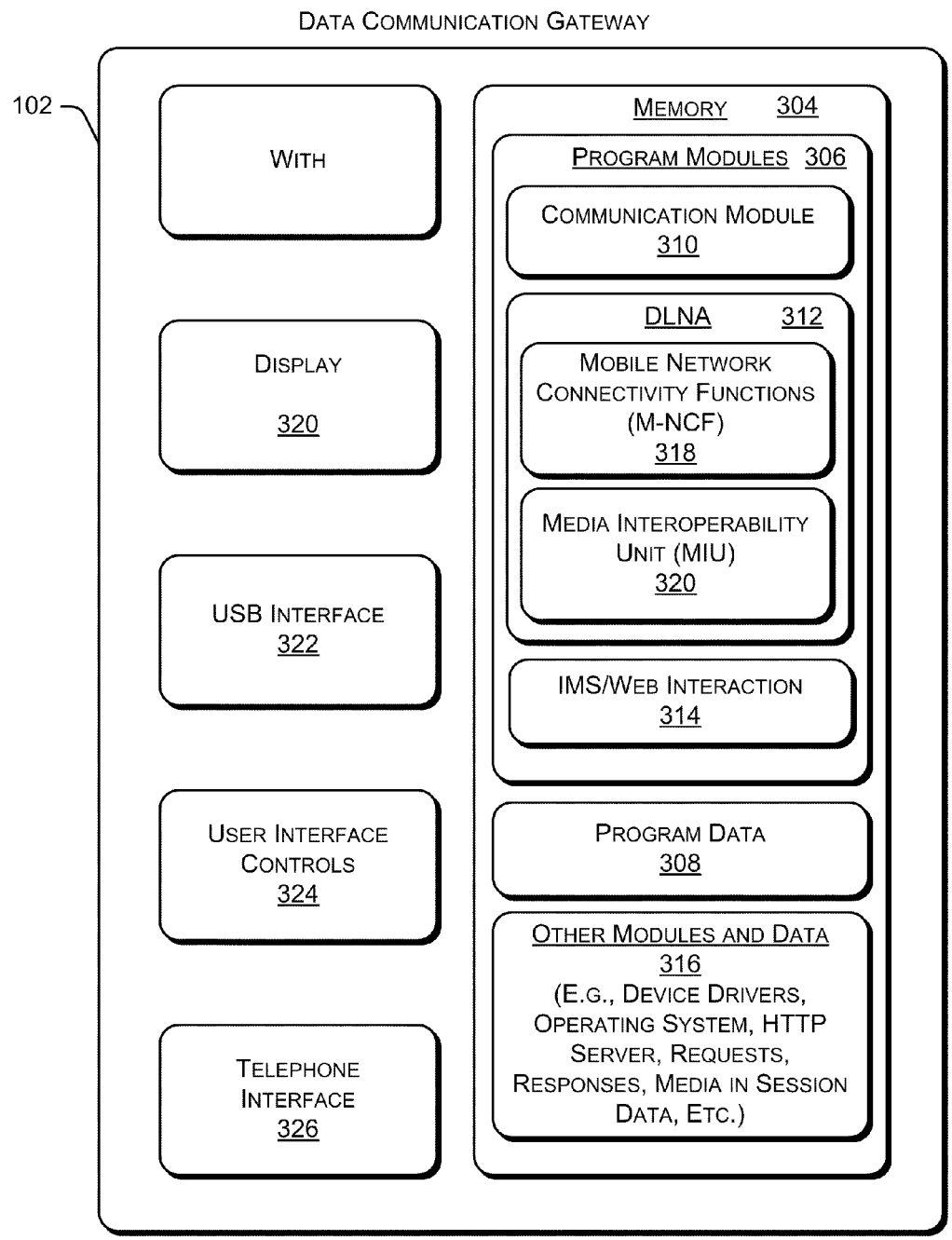
FIG. 3 shows an exemplary home hub (a data communication gateway) for IMS/Web services interaction, according to one embodiment.

FIG. 3 is a block diagram showing various components of an exemplary data communication gateway, according to one embodiment. Referring to FIG. 3, data communication gateway 102 includes one or more processors 302 operatively coupled to a memory 304. In some embodiments, the processor(s) 302 is/are a central processing unit (CPU), a graphics processing unit (GPU), or both CPU and GPU, or other processing unit. Generally, memory 304 contains program modules comprising computer-readable instructions that are accessible and executable by processor 302 and program data 308. Memory 304 may comprise a variety of computer readable storage media, including both volatile and non-volatile storage media (e.g., RAM, ROM, Flash Memory, miniature hard drive, memory card, or the like). Additionally, in some embodiments, memory 304 includes one or more Subscriber Identity Modules (SIMs), which are removable memory cards used to identify a user of the data communication gateway 102 to a telephone service network (shown as a respective portion of network 212 (FIG. 2).

Processor 302 executes various computer program instructions in memory 304 to implement the functions described herein for IMS/Web services interaction. Any number of program modules 306 can be stored in memory 304. In this particular implementation, program modules 306 include, for example, communication module 310, DLNA-based modules 312, IMS/Web interaction module 314, and other program modules (e.g., device drivers, an operating system, etc.) and data 316.

More particularly, communication module 310 allows data communication gateway 102 to communicate with other devices and systems, such as the systems and devices shown in FIGS. 1 and 2. Additionally, communication module 310 allows data communication gateway 102 to communicate with devices and systems via data communication network 212 (FIG. 2). In a particular embodiment, communication module 310 includes a Wi-Fi communication interface, DECT communication interface, a Wi-Max interface, a Bluetooth interface that performs the function of transmitting and receiving wireless communications using, for example, the IEEE 802.11, 802.16, and/or 802.20 standards, and various other data communication interfaces and protocols.

DLNA module 312 includes Mobile Network Connectivity Functions module 318 (M-NCF) to provide a bridge between DLNA-capable devices within the home network connectivity (a respective portion of network 212 (FIG. 1)). DLNA module 312 further includes, for example, a Media Interoperability Unit (MIU) to provide content transformation between devices either in the home network and a remote network (respective portions of network 212).

In one implementation, for example, the data communications gateway 102 acts as an UPnP (Universal Plug and Play) control point, which learns about device capabilities and provides content transformation between UPnP devices in the home network and remote network. In another implementation, DLNA is used to determine non-SIP device capabilities.

The data communication gateway 102 may utilize the discovered non-SIP enabled device capabilities to forward SIP requests to only specific SIP service-capable devices (e.g., devices supporting any of the following mapped SIP services, e.g., Voice over IP, VoIP/video, instant messaging, and presence). The data communications gateway 102 may provide Network Address Translation (NAT) if IPv4 is used.

IMS/Web interaction module ("interaction module") 314 allows consumer computing devices (e.g., claim devices 202 through 208 of FIG. 1) to access SIP and IMS services independent of whether the respective devices are SIP/IMS-enabled client devices. IMS services include all SIP extensions as defined in IMS. In this scenario, the data communication gateway 102 acts as an IMS client on behalf of non-SIP-enabled client computing devices. An IMS client refers to IMS phones, IMS-capable computing devices, and so on. To this end, the interaction module 314 registers on behalf of all consumer devices operatively coupled to the data communication gateway 102. Interaction module 314 translates protocols used in the IMS such as SIP, XML Configuration Access Protocol (XCAP), real-time protocol (RTP), and Message Sessions Relay Protocol (MSRP) into protocol supported by DLNA-capable devices. Interaction module 314 is aware of the connected DLNA devices (the devices in the home network). Accordingly, the interaction module forwards content only to devices able to receive it. For example, if multiple phones are connected to data communication gateway 102, interaction model 314 forwards an incoming call (from outside the home network) to one, several, or all cell phones which are connected in the home network.

In one implementation, interaction module 314 bridges other networks, e.g., networks using Extensible Messaging and Presence Protocol (XMPP) or Google Wave (technology based on XMPP). In some implementations, responsive to receiving requests in a particular native protocol (e.g., HTTP or other protocol) from a client device, interaction module 314: (1) translates received requests into corresponding SIP methods directed to the IMS network; and (2) translates corresponding SIP responses from the IMS network into the corresponding native protocol (e.g., HTTP, XMPP, etc.) for communication to the client and to provide the client with the requested IMS service(s). In one implementation, for example, certain message translations are implemented via:

a) With Extensible Messaging and Presence Protocol (XMPP)/Jingle, wherein XMPP is translated into SIP and SIP is translated into XMPP, with different identity mappings for XMPP and SIP being performed by the interaction module;

b) Using HTTP over Simple Object Access Protocol (SOAP), such as implementing some of the Parlay-X specifications such as presence, call control, and conferencing in the system hub; and/or c) Implementing a RESTful interface such as a Uniform Resource Locator (URL) including the arguments used to generate the corresponding SIP methods (e.g., an XML document may be used, and arguments could be based on the SIP Factory method defined in JSR 389 specification as an ASCII string, identifiers of the sender (from) and recipient (to)).

In another implementation, media associated with a session are carried over HTTP and transformed as UDP/TCP packets by the interaction module 314 according to RFC 3261. Message Session Relay Protocol (MSRP) payloads are carried over TCP. In some implementations, data communication gateway 102 in combination with logic implemented in interaction module 314 operates as an unlicensed spectrum home/enterprise wireless access point (a UMA/GAN access point) or a femtocell (also called Home Node B by 3$^{rd}$ Generation Partnership Project—3GPP).

In one embodiment, data communication gateway 102 also includes a display 320, a USB (Universal Serial Bus) interface 320, and user interface controls 324. Display 320 presents information to a user of data communication gateway 102, such as operating information, configuration settings, and menu navigation information. USB interface 322 allows data communication gateway 102 to communicate with other devices using a USB port. A particular implementation of data communication gateway 102 includes two USB ports. User interface controls 324 may include one or more of buttons, LEDs (Light-Emitting Diodes), and the like to receive instructions from a user of data communication gateway 102 and to communicate information to the user in combination with display 320, as discussed above.

Data communication gateway 102 further includes telephone interface 326 for communicating with one or more conventional analog telephones, such as wired telephones 208(1) and 208(2) shown in FIG. 1. Data received via telephone interface 314 is communicated to other devices or systems connected directly to data communication gateway 102 or coupled to the gateway via data communication network 212.

Exemplary IMS/Web Service Interactions

Figure 4:
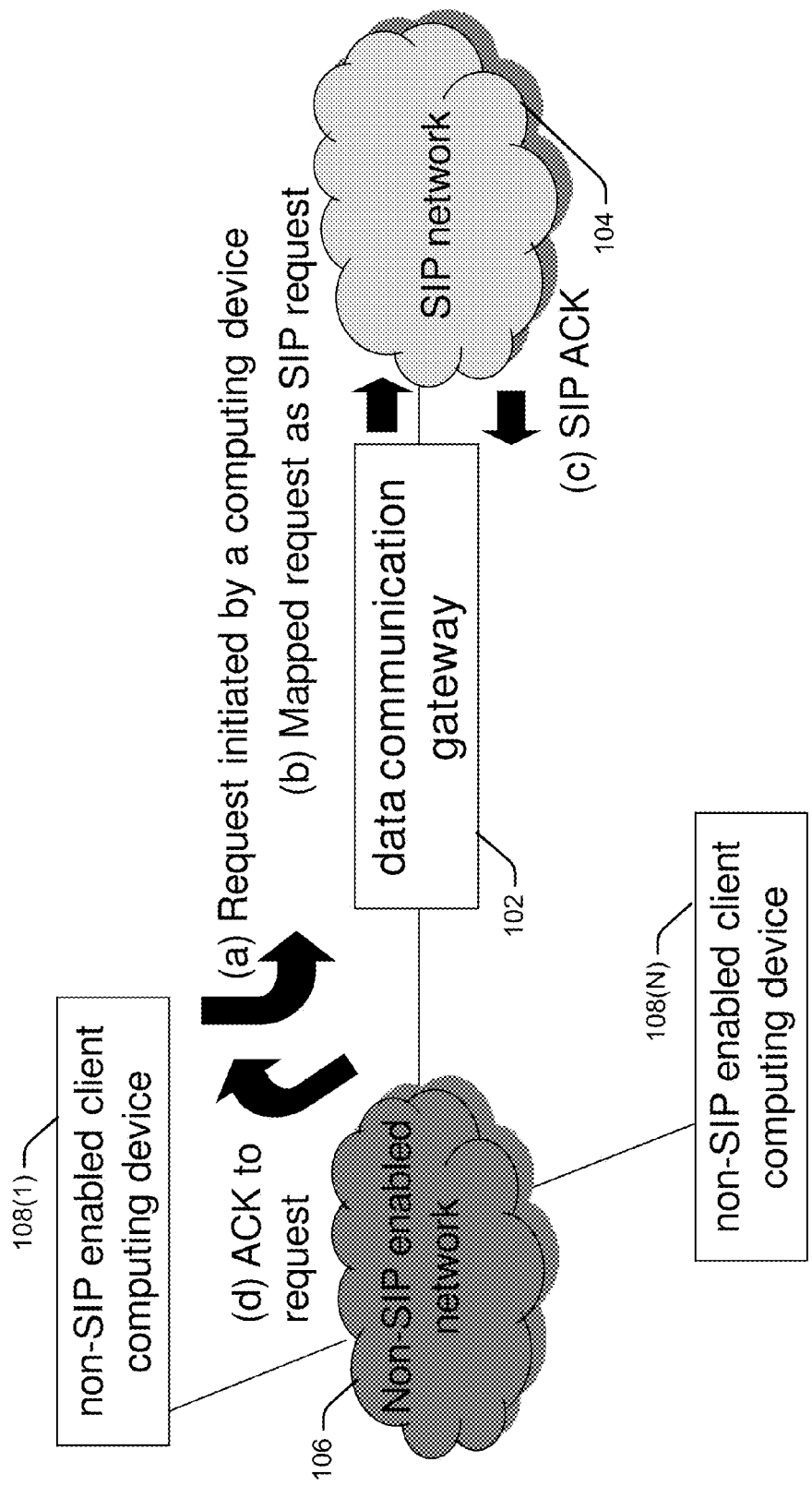
FIG. 4 shows exemplary messaging and data flow for a request to the home hub to broker SIP service(s) on behalf of a non-SIP enabled client, according to one embodiment.

FIG. 4 shows an exemplary message data flow from a non-SIP-enabled client computing device sending a request for a service provisioned by a SIP network, according to one embodiment. As illustrated by directional arrow (a), a non-SIP-enabled client 108(1) sends a request to the data communication gateway 102. Referring to (b), the data communication gateway 102 maps the request as a SIP request and sends the SIP request to a receiving device in the SIP network 104. At (c), the data communication gateway 102 receives a SIP acknowledgment (ACK) corresponding to the communicated SIP request. Responsive to this received ACK, the data communication gateway 102 translates the SIP message into the corresponding protocol being utilized by the client 108 and communicates the ACK request to the non-SIP-enabled client computing device (please see (d)).

To illustrate this, the data communication gateway 102, after registering on behalf of one or more non-SIP-enabled client computing devices (non-SIP devices), may receive a request from one of the devices over a non-SIP network. In this scenario, the data communication gateway 102 will map the request to a SIP equivalent and forward the SIP equivalent to the SIP-based network. Responsive to this forwarding, the data communication gateway 102 will receive a SIP acknowledgment. The data communication gateway 102 maps and forwards the SIP acknowledgment to the requesting non-SIP device. In this scenario, media may be carried over IP protocols such as Real-Time Protocol (RTP) and/or Message Session Relay Protocol (MSRP).

Figure 5:
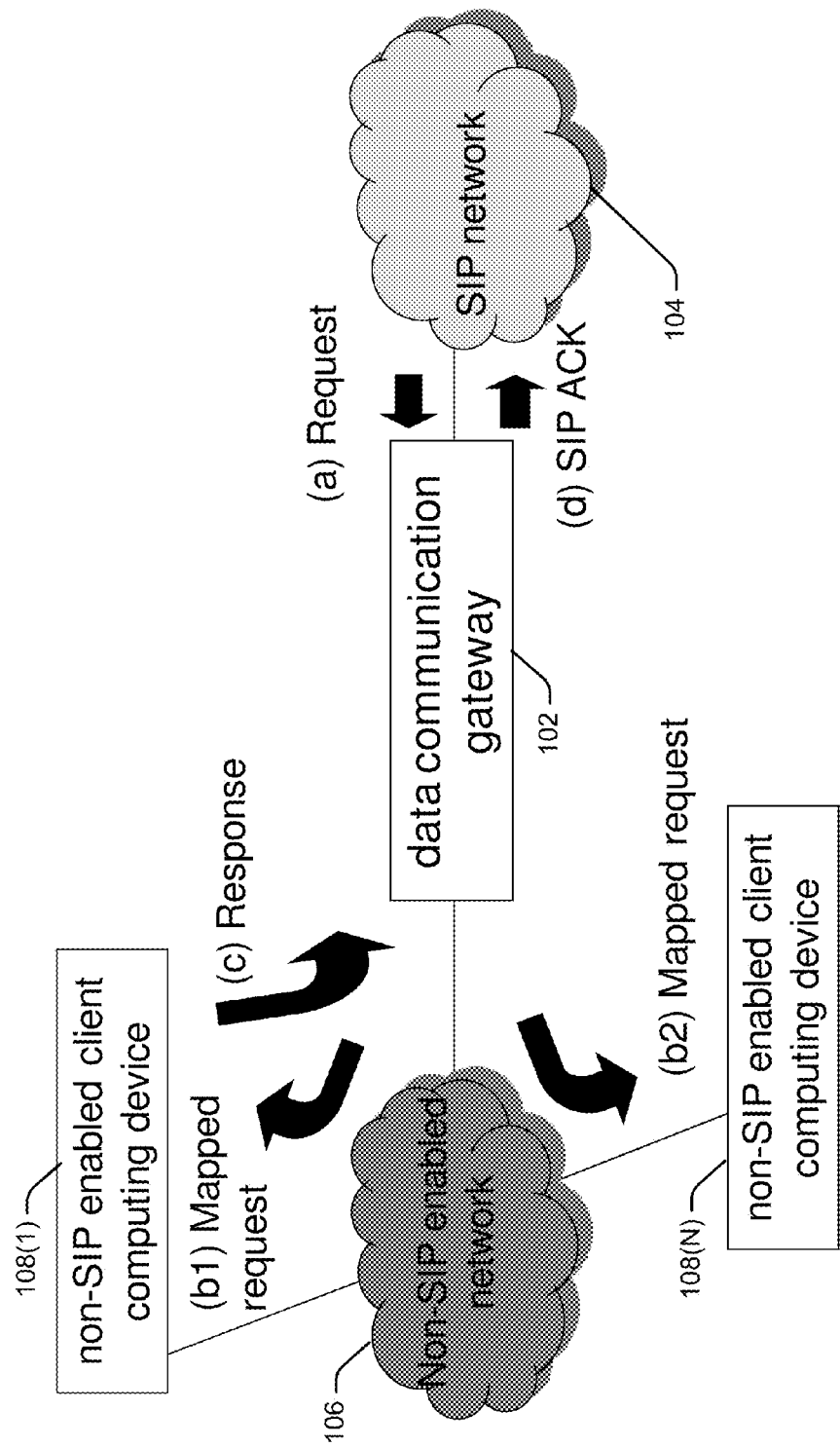
FIG. 5 shows exemplary messaging and data flow for a home hub-to-broker service initiation between an SIP network and a non-SIP enabled client (the home hub registering by proxy for the non-SIP client in the SIP network), according to one embodiment.

FIG. 5 shows an exemplary message data flow between a SIP-enabled device (not shown) in a SIP network 104 and a non-SIP-enabled device 108(1) operatively coupled to a non-SIP enabled network 106, according to one embodiment. As illustrated by directional arrow (a), data communication gateway 102 receives a SIP request from the SIP network 104. Referring to (b), the data communication gateway 102 maps the request through protocol utilized by the receiving device 108(1) and sends the map request to the receiving device. At (c), the receiving device communicates with a corresponding response to the mapped request to the data communication gateway 102. At (d), and responsive to this received response, the data communication gateway 102 translates the response into a corresponding SIP message and communicates the SIP response to the requesting SIP-enabled device.

In one implementation, the data communication gateway 102 receives a SIP request from a SIP-enabled device in a SIP network. The data communication gateway 102 then forwards the SIP request only to end-user selected non-SIP-enabled client computing device(s). For example, the user can identify via a web interface the particular device(s) to receive such requests into the home hub and dispatch received requests based on what the user has defined.

Figure 6:
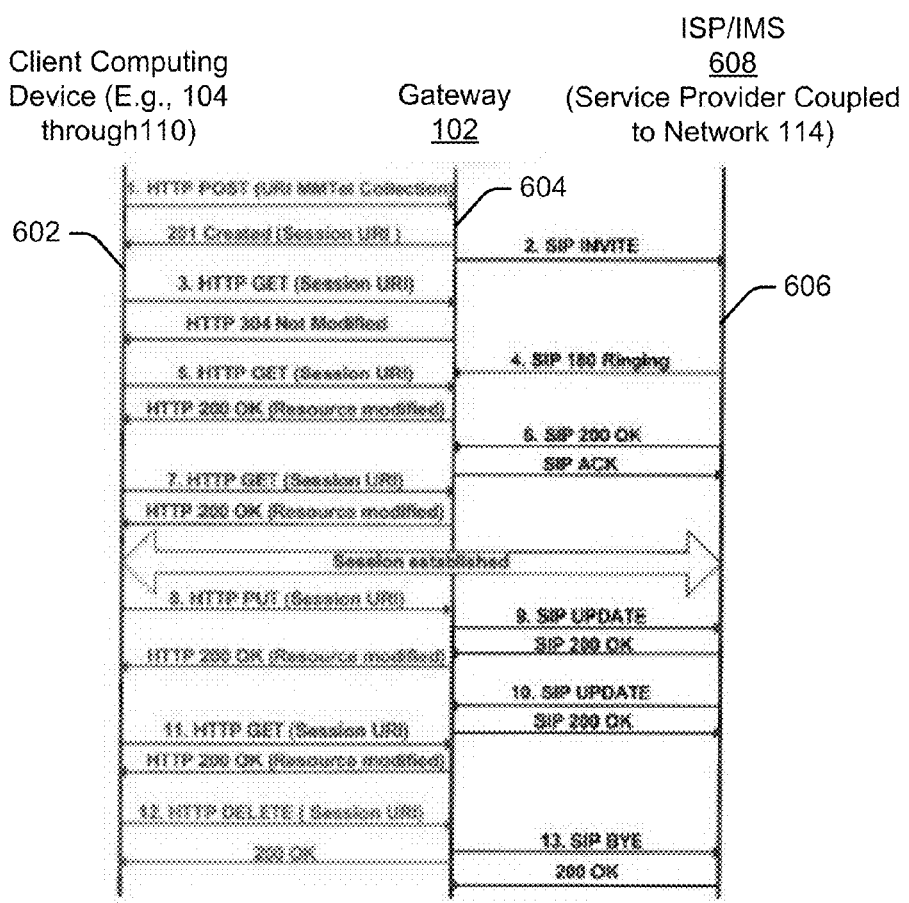
FIG. 6 shows an exemplary set of message flows between an HTTP-enabled client computing device to access Session Initiation Protocol services through home hub interaction services, according to one embodiment.

FIG. 6 shows an exemplary set of HTTP to/from Session Initiation Protocol (SIP) interactions between a client computing device and a data communication gateway 102, according to one embodiment. In the Figures, the left-most digit of a component reference number identifies the particular Figure in which the component first appears. As shown, FIG. 6 shows right-facing directional arrows (→) and left-facing directional arrows (←) representing messages being directed to/from respective components/entities of system 100 from/to other components/entities of the system. First vertical line 602 shows HTTP messages that are sent or received by a client computing device of system 100 such as a media-enabled tablet. Second vertical line 604 shows HTTP messages communicated to/from data communication gateway 102 respectively from/to the client computing device. The second vertical line 604 also illustrates corresponding SIP messages being sent to or received from an ISP or IMS Operator 608. Vertical line 606 illustrates messages targeted to and received by an ISP/IMS Operator 608 from data communication gateway 102. Vertical line 606 further shows those SIP messages communicated from the entity 608 to data communication gateway 102.

In this particular example, the client computing device (e.g., a device 202 through 208) operates a web browser to access Web server functionality in data communication gateway 102. Such Web server functionality is shown as a respective portion of other program modules and data 316. Here, the interaction module 314 translates: (a) between the HTTP messages to/from the client computing device; and (b) SIP messages to/from ISP/IMS Operator 608. Via this interaction, interaction module 314 manages the identity of the client computing device in the IMS environment and provides non-SIP clients that have HTTP capabilities with access to IMS services.

Exemplary XMPP/SIP interactions, according to one implementation, wherein an XMPP user sends a message from a client device operatively coupled to data communication gateway 102, follow:

```
<<Message from = 'juliet@example.com/balcony'
to = 'romeo@example.net'>
<body> Art Thou Not Romeo, and a Montague? </body>
</message>
```

Interaction module 314 translates this exemplary message into a SIP MESSAGE as follows:
MESSAGE sip:romeo@example.net SIP/2.0
Via: SIP/2.0/TCP x2s. Example.com; branch=z9hG4bK776sgdkse
Max—Forwards: 70
From: sip: juliet@example.com; tag=49583
To: sip:romeo@example.net
Call—ID:Hr0zny91@example.com
CSeq: QQ1 MESSAGE Content-Type: text/plain
Content-Length: 36
Art Thou Not Romeo, and a Montague?

An Exemplary Procedure

Figure 7:
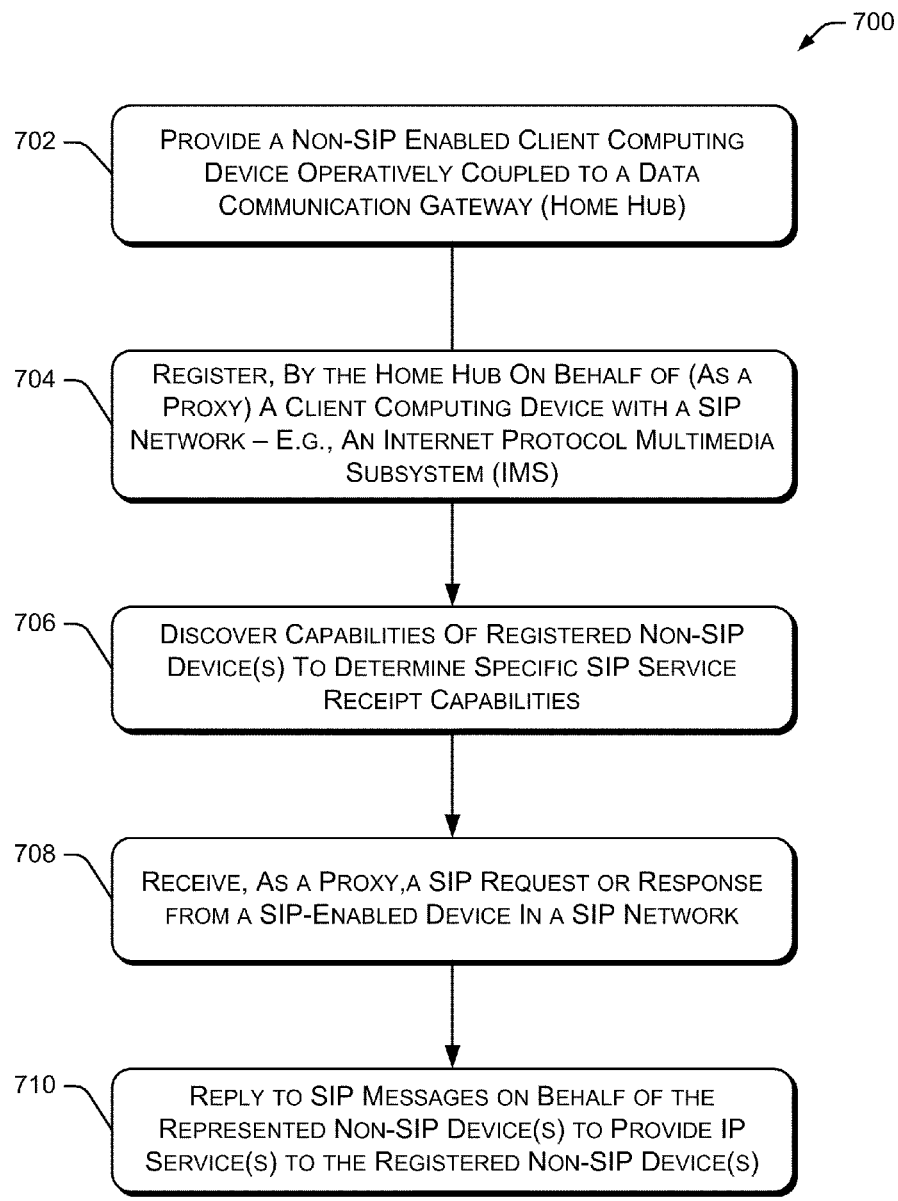
FIG. 7 shows an exemplary procedure for home hub IMS/Web services interaction, according to one embodiment.

FIG. 7 shows an exemplary procedure 700 for home hub for IMS/Web services interaction, according to one embodiment. Referring to FIG. 7, operations of block 702 provide one or more client computing devices. The client computing device(s) are operatively coupled to a data communication gateway 102 or home hub (FIG. 1). In one implementation, the client devices are operatively coupled to the data communication gateway 102 via a wireline or wireless network such as Wi-Fi or DECT. The client computing device(s) may not be SIP enabled. Operations of block 704 register the client computing devices with an IMS Operator. More specifically, the home hub registers on behalf of the respective non-SIP devices to essentially proxy between the devices in the SIP network 104. Operations of block 706 discover capabilities of registered non-SIP device(s) to determine specific SIP service receipt capabilities of the device(s) (e.g., can the device receive VoIP, etc.). Operations of block 708 receive, as a proxy, a SIP request or response from a SIP-enabled device in a SIP network. Operations of block 710 reply to SIP messages on behalf of the represented non-SIP device(s) to provide SIP service(s) to requesting (or SIP network targeted) registered non-SIP device(s).

To support receiving calls from the IMS, the devices support long-held HTTP requests, which allow the data communication gateway 102 to push data to a browser without the browser explicitly requesting it, such as COMET if the data communication gateway 102 acts as an HTTP (including REST)/SIP gateway.

When data communication gateway 102 acts as an XMPP/SIP gateway, it can support incoming and outgoing calls and messages (e.g., instant messaging and presence).

CONCLUSION

Although the systems and methods for home hub for IMS/Web services interaction have been described in language specific to structural features and/or methodological operations or actions, it is understood that the implementations defined in the appended claims are not necessarily limited to the specific features or actions described. Rather, the specific features and operations of data encryption and data communication are disclosed as exemplary forms of implementing the claimed subject matter.

The invention claimed is:

1. A method implemented in a data communication gateway, the method comprising:
    registering, by a data communication gateway, identifying information obtained on behalf of one or more client computing device(s) to an operator of a SIP-based network outside of the data communication gateway, and the client computing device(s) not being Session Initiation Protocol (SIP) enabled;
    replying, from outside of the SIP-based network, to SIP messages using the identifying information registered on behalf of the client computing device(s) to continue to process previous SIP request(s) and provide the client computing device(s) with corresponding SIP-based service(s);
    discovering non-SIP enabled client computing device(s)' SIP service receipt capabilities; and
    using discovered device capabilities, forwarding request(s) to only specific SIP service capable device(s) of the one or more non-SIP enabled client computing devices, the request(s) corresponding to SIP request(s) received from a SIP-enabled network.

2. The method of claim 1, further comprising:
    receiving a SIP request from a SIP-enabled device in a SIP network; and
    forwarding the SIP request only to end-user selected non-SIP-enabled client computing device(s).

3. The method of claim 1 wherein the SIP network supports IP Multimedia Subsystem (IMS), and wherein the method further comprises participating as an IMS client on behalf of the client computing device(s).

4. The method of claim 1, further comprising performing IMS registration on behalf of one or more of the client computing device(s).

5. The method of claim 4 wherein the performing is based on IMS information, the IMS information including one or more of public and private user identities, credentials, and address of an IMS entry point.

6. The method of claim 5 wherein the IMS information is stored in the data communication gateway.

7. The method of claim 1 wherein the method further comprises
    determining capabilities of the client computing device; and
    implementing content transformation between the client computing device and a remote network, the client computing device being operatively coupled to a home network via home hub characteristics of the data communication gateway.

8. The method of claim 7, further comprising receiving a non-SIP request from a device of the client computing device(s), the non-SIP request being based on HTTP over Simple Object Access Protocol (SOAP), the non-SIP request corresponding to receipt by the device of the corresponding SIP-based service(s).

9. The method of claim 7, further comprising implementing a Representational State Transfer (REST) interface to generate methods corresponding to a SIP service.

10. The method of claim 7, further comprising to provide the corresponding SIP based service(s):
    carrying media associated with a session over HTTP;
    transforming the HTTP to UDP/TCP packets;
    receiving UDP/TCP packets from the corresponding SIP service(s);
    transforming received UDP/TCP packets into HTTP; and
    delivering the HTTP to the device to provide the corresponding SIP service(s).

11. A non-transitory, tangible computer-readable medium comprising computer program instructions executable by a processor, the computer program instructions when executed by the processor for performing operations comprising:
    registering, by a data communication gateway, identifying information obtained on behalf of one or more client computing device(s) to an operator of a SIP-based network outside of the data communication gateway, and the client computing device(s) not being Session Initiation Protocol (SIP) enabled;
    replying, from outside of the SIP-based network, to SIP messages using the identifying information registered on behalf of the client computing device(s) to continue to process previous SIP request(s) and provide the client computing device(s) with corresponding SIP-based service(s);
    discovering non-SIP enabled client computing device(s)' SIP service receipt capabilities; and
    using discovered device capabilities, forwarding request(s) to only specific SIP service capable device(s) of the one or more non-SIP enabled client computing devices, the request(s) corresponding to SIP request(s) received from a SIP-enabled network.

12. The tangible computer-readable medium of claim 11 wherein the operations further comprise operations for implementing a Representational State Transfer (REST) interface to generate methods corresponding to the SIP-based service(s).

13. The tangible computer-readable medium of claim 11 wherein the operations further comprise operations for:
   receiving a SIP request from a SIP-enabled device in a SIP network; and
   forwarding the SIP request only to end-user selected non-SIP-enabled client computing device(s).

14. The tangible computer-readable medium of claim 11 wherein the SIP network supports IP Multimedia Subsystem (IMS), and wherein the operations further comprise operations for participating as an IMS client on behalf of the client computing device(s).

15. The tangible computer-readable medium of claim 11 wherein the operations further comprise operations for performing IMS registration on behalf of one or more of the client computing device(s).

16. The tangible computer-readable medium of claim 15 wherein the operations for performing are based on IMS information, the IMS information including one or more of public and private user identities, credentials, and address of an IMS entry point.

17. The tangible computer-readable medium of claim 11 wherein the operations further comprise operations for:
   determining capabilities of the client computing device; and
   implementing content transformation between the client computing device and a remote network, the client computing device being operatively coupled to a home network via home hub characteristics of the data communication gateway.

18. A data communication gateway comprising:
a processor; and
a memory operatively coupled to the processor, the memory comprising computer program instructions executable by the processor, the computer program instructions when executed by the processor for performing operations comprising:
   registering, by a data communication gateway, identifying information obtained on behalf of one or more client computing device(s) to an operator of a SIP-based network outside of the data communication gateway; and
   replying, from outside of the SIP-based network, to SIP messages using the identifying information registered on behalf of the client computing device(s) to continue to process previous SIP request(s) and provide the client computing device(s) with corresponding SIP-based service(s);
   discovering non-SIP enabled client computing device(s)' SIP service receipt capabilities; and
   using discovered device capabilities, forwarding request(s) to only specific SIP service capable device(s) of the one or more non-SIP enabled client computing devices, the request(s) corresponding to SIP request(s) received from a SIP-enabled network.

* * * * *